(12) United States Patent
Kimura et al.

(10) Patent No.: US 7,749,638 B2
(45) Date of Patent: Jul. 6, 2010

(54) MANUFACTURING METHOD OF LAMINATION BODY OF ELECTROLYTIC BODY AND PARTICLE, LAMINATION BODY OF ELECTROLYTIC BODY AND PARTICLE, ELECTROCHEMICAL ELEMENT, FUEL BATTERY, AND PORTABLE MACHINE

(75) Inventors: Okitoshi Kimura, Kanagawa (JP); Shohji Tanaka, Kanagawa (JP); Aino Hasegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1511 days.

(21) Appl. No.: 11/081,746

(22) Filed: Mar. 17, 2005

(65) Prior Publication Data
US 2005/0250001 A1 Nov. 10, 2005

(30) Foreign Application Priority Data
Mar. 18, 2004 (JP) ............... 2004-078180

(51) Int. Cl.
H01M 4/88 (2006.01)
H01M 4/86 (2006.01)
H01M 4/08 (2006.01)

(52) U.S. Cl. ............ 429/40; 429/12; 502/101
(58) Field of Classification Search ............ None
See application file for complete search history.

(56) References Cited

U.S. PATENT DOCUMENTS

| | | | |
|---|---|---|---|
| 4,837,096 A | 6/1989 | Kimura | |
| 4,886,572 A | 12/1989 | Kimura | |
| 4,948,685 A | 8/1990 | Ohsawa | |
| 4,999,263 A | 3/1991 | Kabata | |
| 5,011,751 A | 4/1991 | Yoneyama | |
| 5,021,318 A | 6/1991 | Mayo et al. | |
| 5,037,713 A | 8/1991 | Yoshino | |
| 5,077,152 A | 12/1991 | Yoshino | |
| 5,100,437 A | 3/1992 | Yoshino | |
| 5,162,178 A | 11/1992 | Ohsawa | |
| 5,223,353 A | 6/1993 | Ohsawa | |
| 5,437,943 A | 8/1995 | Fujii | |

(Continued)

FOREIGN PATENT DOCUMENTS

JP 42-23910 11/1942

(Continued)

OTHER PUBLICATIONS

Morikawa et al., Preparation of membrane electrode assembly for fuel cell by using electrophoretic deposition process, 2004, Journal of the Electrochemical Society, 151(10), pp. A1733-A1737.*

(Continued)

*Primary Examiner*—Patrick Ryan
*Assistant Examiner*—Angela J. Martin
(74) *Attorney, Agent, or Firm*—Dickstein Shapiro LLP

(57) ABSTRACT

A manufacturing method of a lamination body of an electrolytic body and a particle includes the steps of: a) electrostatically charging an electrostatic carrier configured to carry static electricity at a designated polarity; b) contacting the electrostatically charged electrostatic carrier with dispersion liquid formed by dispersing the particle electrostatically charged at a polarity reversed to the designated polarity into a dispersion medium; and c) transferring the particle adhering to the electrostatic carrier to the electrolytic body made of electrolyte.

12 Claims, 4 Drawing Sheets

U.S. PATENT DOCUMENTS

| | | | |
|---|---|---|---|
| 5,489,492 | A | 2/1996 | Asami |
| 5,885,733 | A | 3/1999 | Ohsawa |
| 5,900,336 | A | 5/1999 | Kabata |
| 6,013,393 | A | 1/2000 | Taniuchi |
| 2003/0054225 | A1 | 3/2003 | Kaji et al. |
| 2004/0072061 | A1 | 4/2004 | Nakano et al. |
| 2004/0209138 | A1 | 10/2004 | Ueyama et al. |
| 2005/0208235 | A1* | 9/2005 | Murai et al. ............. 428/32.38 |
| 2005/0288177 | A1* | 12/2005 | Hatoh et al. ................ 502/101 |
| 2007/0020406 | A1* | 1/2007 | Hattori ...................... 428/1.6 |

FOREIGN PATENT DOCUMENTS

| | | |
|---|---|---|
| JP | 63-243298 | 10/1988 |
| JP | 03-141382 | 6/1991 |
| JP | 2003-163011 | 6/2003 |
| JP | 2004-79244 | 3/2004 |
| WO | WO03/077336 | 9/2003 |

OTHER PUBLICATIONS

K. Sugimoto et al., "Preparation of an MEA containing a large amount of inorganic particles in the electrolyte membrane," Electrochemical Society 2003 Spring Convention, 3N08, p. 313.

Hiroshi Morikawa et al., "Preparation of Membrane Electrode Assembly for Fuel Cell by Using Electrophoretic Deposition Process," Electrochemical Society 2003 Spring Convention, 3N09, p. 314.

* cited by examiner

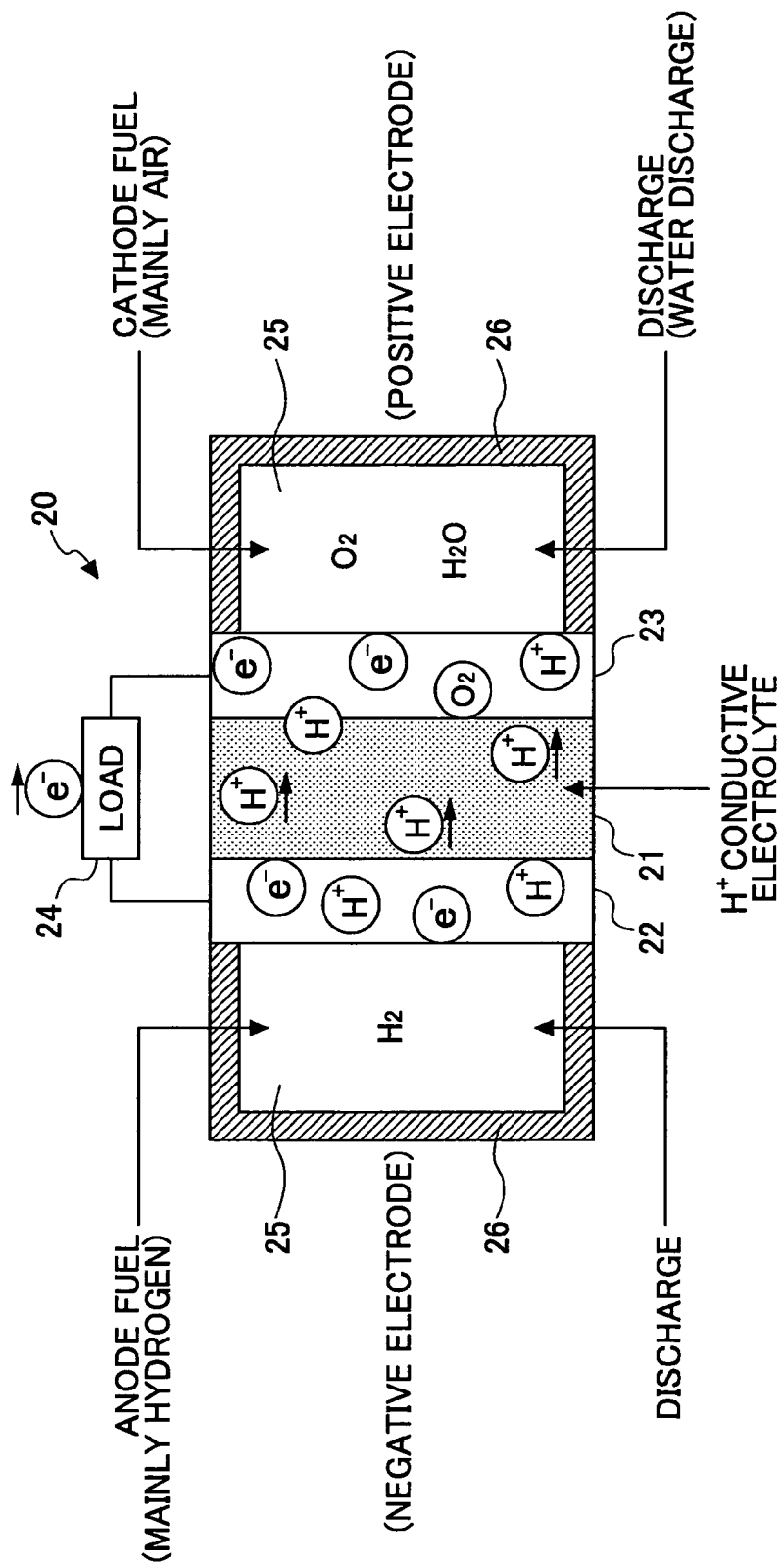

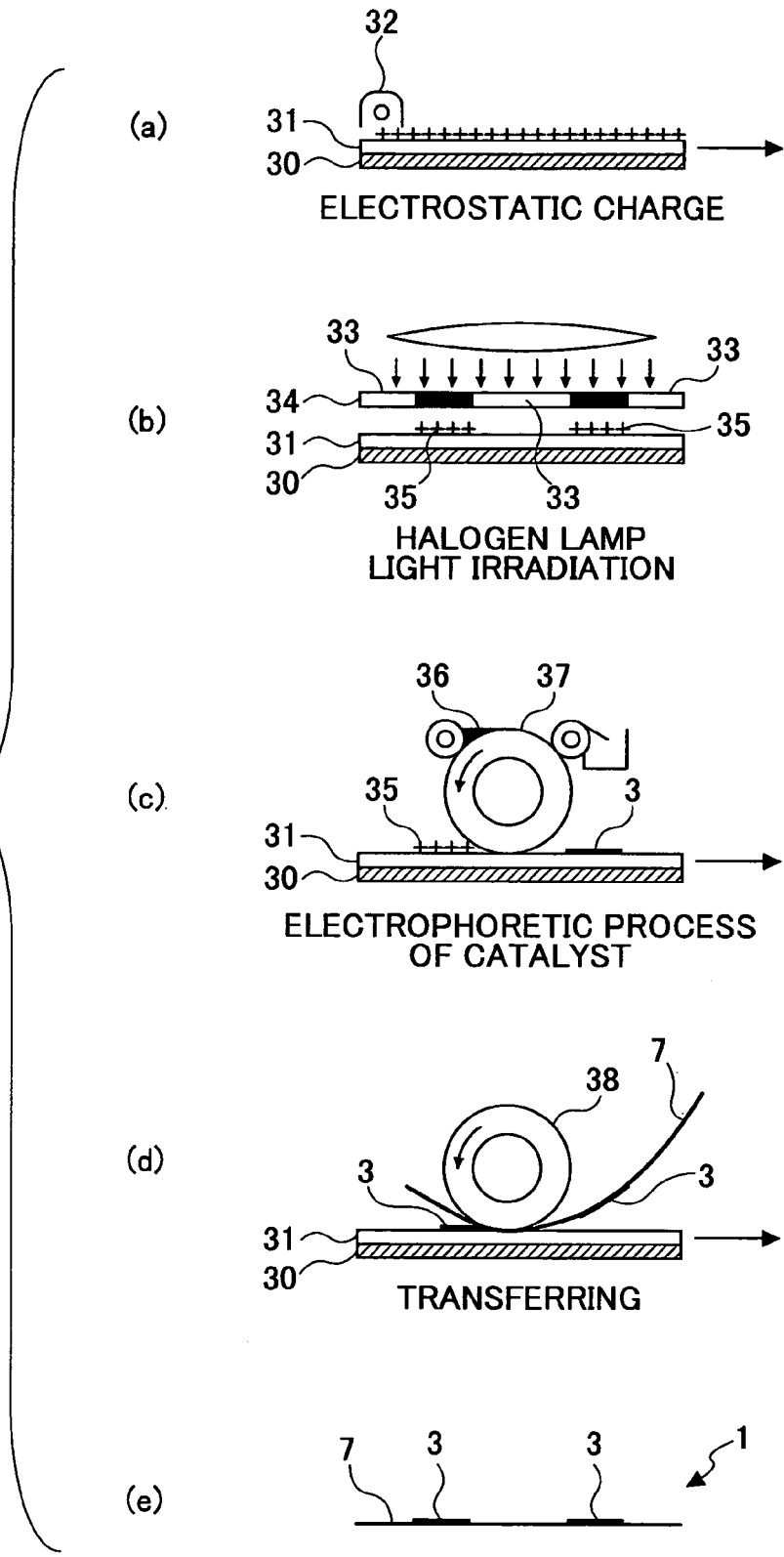

MANUFACTURING METHOD OF LAMINATION BODY OF ELECTROLYTIC BODY AND PARTICLE, LAMINATION BODY OF ELECTROLYTIC BODY AND PARTICLE, ELECTROCHEMICAL ELEMENT, FUEL BATTERY, AND PORTABLE MACHINE

BACKGROUND OF THE INVENTION

1. Field of the Invention

The present invention relates to manufacturing methods of lamination bodies of electrolytic bodies and particles, the lamination bodies of the electrolytic bodies and the particles, electrochemical elements, fuel batteries, and portable machines.

2. Description of the Related Art

An electrochemical element, more specifically an element generating or accumulating electric energy, often has a structure having a layer whereby an electron (electrical charge) can be generated or accumulated and a layer propagates an ion. For example, a primary battery, a secondary battery, a fuel battery, a solar battery, a condenser, an electrolytic element, various sensors, and others belong to this category. They have structures where an ion conductive layer (in a liquid state or solid state) is put between a cathode layer and an anode layer conducting electrons. These lamination bodies such as a lamination body used for the primary battery or the secondary battery are manufactured by a method whereby a paste whose main material is an active material is applied to an ion propagation layer and dried or a method whereby the paste is applied to a collector body and dried and then unified with an ion propagation layer. The lamination body for the fuel battery or the electrolytic element is manufactured by a method whereby a paste which includes a catalytic metal and whose main material is carbon is applied to an ion propagation layer or a method whereby the paste is applied on a carbonic paper or a carbonic cloth as a collector body and then unified with an ion propagation layer. In either case, the layer generating or accumulating the electrons is formed by the application. A blade coating method, a die coating method, a wire-bar coating method, a screen printing method, or a flexography printing method is currently used for this application method (process). By using the blade coating method, the die coating method, or the wire-bar coating method, the application can be continuously performed on a continuous substrate and therefore a large area can be coated with high productivity.

A filtration method, an electrophoresis method, a micelle electrolysis method, or the like is used as a method other then the above application method. The filtration method is a method used for lamination of solids and applied to manufacturing of an electrode of an electrochemical device (See non-patent publication "Electrochemical Society 2003 Spring Convention", 3N08, page 313). The electrophoresis method is a method whereby a direct-current electric field is applied to a particle electrostatically charged in liquid so that the particle is moved in an electric field direction of a polarity reversed to the polarity where the particle is electrostatically charged. This method is also applied to manufacturing of the electrode of the electrochemical device (See non-patent publication "Electrochemical Society 2003 Spring Convention", 3N09, page 314). This is a technology wherein a porous film or an ion conductive film is arranged between positive and negative electrodes (direct-current electrical field) so that the film and the particle are combined. The micelle electrolysis method is a method whereby micelle made by a surface contact (micelle formation agent) having an oxidation-reducible part like ferrocene is oxygenated or reduced on an electrode surface so as to undergo decay and thereby a material of the inside of the micelle is piled on the electrode surface (See Japanese Examined Patent Publication No. 3-59998).

However, in the blade coating method, the die coating method, and the wire-bar coating method, it is not possible to apply the paste having any size (a configuration such as a square or rectangular configuration) at any position. Furthermore, application position precision is not high. In addition, in a method wherein a printing plate is used such as the screen printing method or flexography printing method, although it is possible to apply the paste having any size at any position, there is a problem in that the plate has to be remade in order to change the printing position or printing configuration.

Furthermore, in the filtration method is a method (See non-patent publication "Electrochemical Society 2003 Spring Convention", 3N08, page 313), wherein since a lamination configuration is determined by a configuration of a filtration surface, correspondence to a configuration change or configuration control is bad. In addition, the more minute the particle is, the more time it takes, so that productivity is reduced.

In the electrophoresis method (See non-patent publication "Electrochemical Society 2003 Spring Convention", 3N09, page 314), since a lamination configuration is determined by a liquid cross-sectional configuration formed by the film and liquid, correspondence to the configuration change or configuration control is bad, as well as the filtration method.

In addition, in the micelle electrolysis method, since an electrochemical reaction on the electrode surface is used, the method can be used only on the electrode surface, namely a substrate having electron conductivity.

SUMMARY OF THE INVENTION

Accordingly, it is a general object of the present invention to provide a novel and useful manufacturing method of a lamination body of an electrolytic body and a particle, the lamination body of the electrolytic body and the particle, an electrochemical element, a fuel battery, and a portable machine.

Another and more specific object of the present invention is to provide a manufacturing method of a lamination body of an electrolytic body and a particle whereby a large quantity of lamination bodies holding functional particles can be easily manufactured in a short period of time and a lamination body having any configuration can be easily manufactured, the lamination body of the electrolytic body and the particle, an electrochemical element, a fuel battery, and a portable machine.

The above object of the present invention is achieved by, as claimed in claim 1, a manufacturing method of a lamination body of an electrolytic body and a particle, including the steps of:

a) electrostatically charging an electrostatic carrier configured to carry static electricity at a designated polarity;

b) contacting the electrostatically charged electrostatic carrier with dispersion liquid formed by dispersing the particle electrostatically charged at a polarity reversed to the designated polarity into a dispersion medium; and c) transferring the particle adhering to the electrostatic carrier to the electrolytic body made of electrolyte.

According to the above-mentioned invention, a large quantity of lamination bodies holding functional particles can be easily manufactured in a short period of time.

The manufacturing method may further include the step of:

d) eliminating the electric charge in only a designated area of the electrostatically charged electrostatic carrier.

According to the above-mentioned invention, since it is possible transfer the particle to the electrolytic body with an optional configuration, it is possible to easily manufacture the lamination body having any configuration.

The electrostatic carrier may be an optical semiconductor device, and light may be irradiated on the designated area of the electrostatically charged electrostatic carrier so that the electric charge in only the designated area of the electrostatically charged electrostatic carrier is eliminated, in the step d).

According to the above-mentioned invention, it is possible to easily manufacture the lamination body having any configuration.

The dispersion liquid may include a high-molecular compound having integrity.

According to the above-mentioned invention, it is possible to improve integrity of the particle.

The high-molecular compound may be an ion conductive polymer.

According to the above-mentioned invention, it is possible to reduce the interface resistance and make the dispersion material simple while the integrity of the particle is kept.

The high-molecular compound may be a fluorine group polymer.

According to the above-mentioned invention, it is possible to improve the electric chemical stability of high-molecule compound while the integrity of the particle is kept.

The dispersion liquid may include a conductive agent.

According to the above-mentioned invention, it is possible to reduce the interface resistance.

The conductive agent may be carbon.

According to the above-mentioned invention, it is possible to reduce the interface resistance and improve electric stability.

The particle may be a metal catalyst.

According to the above-mentioned invention, it is possible to realize an electric chemical catalytic reaction.

The metal catalyst may be made of Pt, Pt and Ru, or Pt and Ir.

According to the above-mentioned invention, it is possible to realize an oxidation reaction of hydrogen and methanol or an electrolysis reaction of water.

The metal catalyst may be made of at least three kinds of catalyst ingredients belonging to the group consisting of Pt, Ru, Ir, W, and Sn.

According to the above-mentioned invention, it is possible to realize an oxidation reaction of ethanol and methanol or an electrolysis reaction of water.

The particle may include a material forming an ion and a compound, a material reacting with an ion, or a material being ionized by an electron.

According to the above-mentioned invention, it is possible to store electric chemical energy.

The above object of the present invention is also achieved by a lamination body of an electrolytic body and a particle, manufactured by a manufacturing method of the lamination body, the manufacturing method including the steps of:

a) electrostatically charging an electrostatic carrier configured to carry static electricity at a designated polarity;

b) contacting the electrostatically charged electrostatic carrier with dispersion liquid formed by dispersing the particle electrostatically charged at a polarity reversed to the designated polarity into a dispersion medium; and c) transferring the particle adhering to the electrostatic carrier to the electrolytic body made of electrolyte.

According to the above-mentioned invention, it is possible to achieve the same effect as the invention claimed in claim 1.

The above object of the present invention is also achieved by an electric chemical element having a lamination body of an electrolytic body and a particle, the lamination body being manufactured by a manufacturing method of the lamination body, the manufacturing method including the steps of:

a) electrostatically charging an electrostatic carrier configured to carry static electricity at a designated polarity;

b) contacting the electrostatically charged electrostatic carrier with dispersion liquid formed by dispersing the particle electrostatically charged at a polarity reversed to the designated polarity into a dispersion medium; and c) transferring the particle adhering to the electrostatic carrier to the electrolytic body made of electrolyte, or by a fuel battery having a lamination body of an electrolytic body and a particle, the fuel battery generating electric power by supplying a fuel to the lamination body, the lamination body being manufactured by a manufacturing method of the lamination body, the manufacturing method including the steps of:

a) electrostatically charging an electrostatic carrier configured to carry static electricity at a designated polarity;

b) contacting the electrostatically charged electrostatic carrier with dispersion liquid formed by dispersing the particle electrostatically charged at a polarity reversed to the designated polarity into a dispersion medium; and c) transferring the particle adhering to the electrostatic carrier to the electrolytic body made of electrolyte.

According to the above-mentioned invention, it is possible to achieve the same effect as the invention claimed in claim 13.

The fuel may include alcohol.

According to the above-mentioned invention, it is possible to improve a driving time of a fuel battery by using a fuel having a high energy density.

The alcohol may be ethanol.

According to the above-mentioned invention, it is possible to provide a fuel battery using a fuel having high environmental conservation and safeness.

The above object of the present invention is also achieved by a portable machine having a fuel battery, the fuel battery having a lamination body of an electrolytic body and a particle, the fuel battery generating electric power by supplying a fuel to the lamination body, the lamination body being manufactured by a manufacturing method of the lamination body, the manufacturing method including the steps of:

a) electrostatically charging an electrostatic carrier configured to carry static electricity at a designated polarity;

b) contacting the electrostatically charged electrostatic carrier with dispersion liquid formed by dispersing the particle electrostatically charged at a polarity reversed to the designated polarity into a dispersion medium; and c) transferring the particle adhering to the electrostatic carrier to the electrolytic body made of electrolyte.

According to the above-mentioned invention, it is possible to achieve the same effect as the invention claimed in any of claim 15 through claim 17.

Other objects, features, and advantages of the present invention will become more apparent from the following detailed description when read in conjunction with the accompanying drawings.

BRIEF DESCRIPTION OF THE DRAWINGS

FIG. 3 is a schematic view of an internal structure of a fuel battery of an embodiment of the present invention; and FIG. 4 is another schematic view for an explanation of a flow of a manufacturing method using light irradiation of a lamination body of an embodiment of the present invention.

DETAILED DESCRIPTION OF THE PREFERRED EMBODIMENTS

A description of the present invention and details of drawbacks of the related art are now given, with reference to FIG. 1 through FIG. 4.

Figure 1:
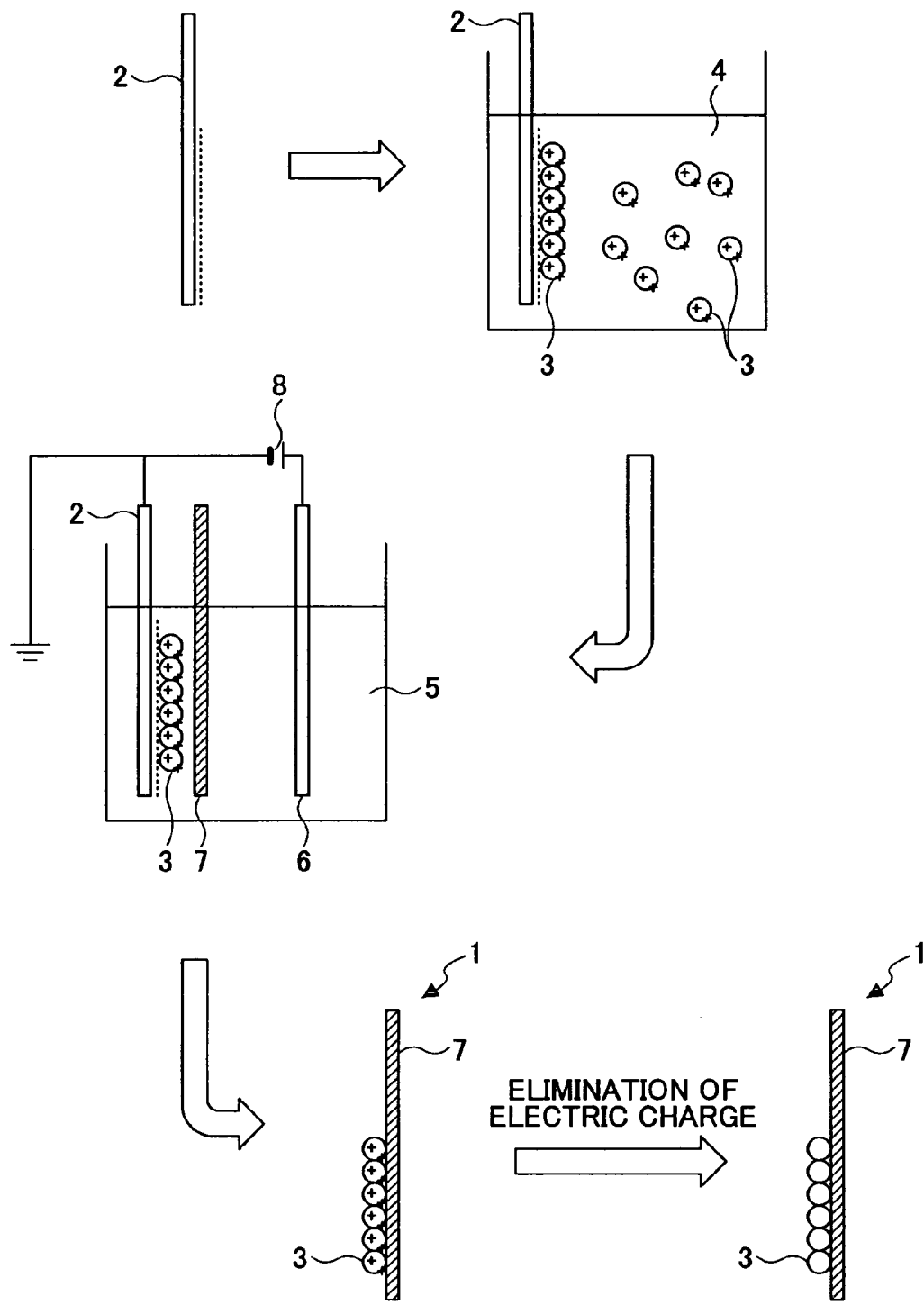
FIG. 1 is a schematic view for an explanation of a flow of a manufacturing method of a lamination body of an embodiment of the present invention.

First, a manufacturing method of a lamination body 1 of an embodiment of the present invention is discussed with reference to FIG. 1. FIG. 1 is a schematic view for an explanation of a flow of the manufacturing method of the lamination body 1 of the embodiment of the present invention.

A substrate 2 as an electrostatic carrier configured to carry static electricity is electrostatically charged. Next, this electrostatically charged substrate 2 is immersed in dispersion liquid 4 including particles 3 charged at a polarity reversed to the polarity of the substrate 2, so that the particles 3 are adhered to the substrate 2. After that, the substrate 2 where the particles 3 adhere is taken out so as to be immersed in liquid 5 not including the particles 3. Then, a substrate 6 facing the substrate 2 is immersed in the liquid 5. An ion conductive film (or porous film) 7 which is an electrolytic body is immersed between the substrates 2 and 6. The substrate where the particles 3 adhere is connected to the substrate 6 via an electric source. A direct-current electric field is applied to the substrate 6 so that the substrate 6 has a polarity reversed to the polarity of the particles 3 ("negative" in an example shown in FIG. 1) and thereby the particles 3 adhering on the substrate 2 are electrophoretically moved to and adhered on the ion conductive film 7. Thus, a lamination body 1 of the ion conductive film 7 and the particle 3 is manufactured. Last, the electrostatic charge of the lamination body 1 is eliminated. It is also possible to directly transfer the particles 3 onto the ion conductive film 7 without using the liquid 5.

Here, any material can be used as the electrostatic carrier (substrate 2) as long as it is capable of carrying the static electricity, more specifically having an insulating or semi-conductive surface. Various methods such as a friction electrostatic charge, corona discharge, and electric charge injection are used as a method for electrostatically charging the electrostatic carrier. In the friction electrostatic charge, two and more kinds of materials are made to physically have frictional contact. In the corona discharge, electrostatic charge is made using an electric charge generated by the application of a high electric field to the air or the like. In the electric charge injection method, an electrostatic charge is made by an electron gun or the like.

It is preferable to use an electrostatic carrier having an optical semiconductor layer as the electrostatic carrier (substrate 2). Here, the optical semiconductor layer (optical semiconductor) can generate a positive or negative electric charge by light irradiation. In a case where such a material is used for the electrostatic carrier of this embodiment, it is possible to eliminate the electric charge by irradiating lights on the electrostatic carrier that is electrostatically charged by the above mentioned method. That is, it is possible to maintain static electricity on a surface with an optional configuration by controlling a part where the light is irradiated.

Figure 2:
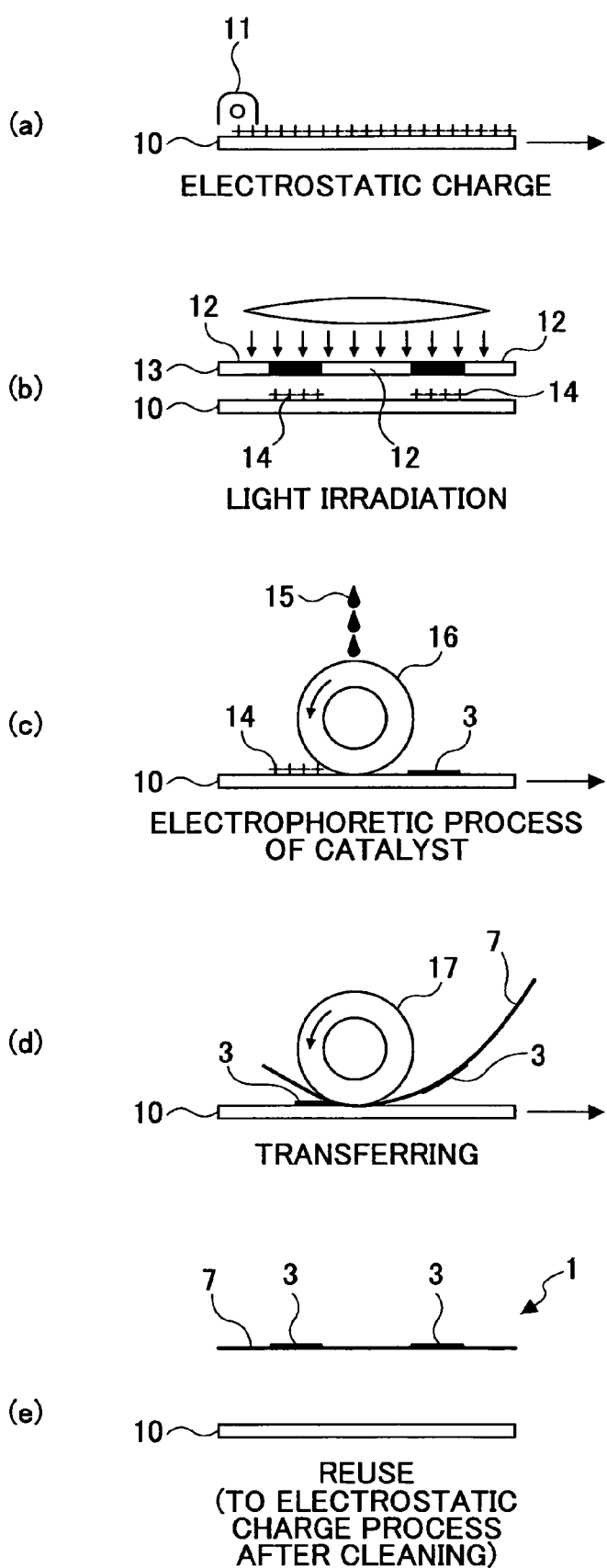
FIG. 2 is a schematic view for an explanation of a flow of a manufacturing method using light irradiation of a lamination body of an embodiment of the present invention.

Next, a manufacturing method using light irradiation is discussed with reference to FIG. 2. FIG. 2 is a schematic view for an explanation of a flow of a manufacturing method using light irradiation of the lamination body 1 of this embodiment of the present invention. Here, the electrostatic carrier having the light semiconductor layer is called an optical semiconductor 10.

An electrostatic charge (positive electrostatic charge) process is applied to the optical semiconductor 10 by an electrostatic charging device 11. See FIG. 2-(a). After that, the light is irradiated on the electrostatically charged optical semiconductor 10 via a mask 13 having an opening part 12 which has an optional configuration, so that an electric charge of only a part where the light is irradiated is eliminated (See FIG. 2-(b)). That is, an electric charge of only a designated area of the electrostatically charged optical semiconductor 10 is eliminated. Thus, a positive electrostatic charge part 14 is formed on the optical semiconductor 10. Next, dispersion liquid 15 (negative electrostatic charge dispersion) where the particles 3 are dispersed is adhered on and a direct-current electrical field is simultaneously applied to an electrostatic charging roller (negative electrostatic charging roller) 16, so that the particles 3 are electrophoretically moved to a positive electrostatic charge part 14 (See FIG. 2-(c)). Next, the particles 3 are transferred to the ion conductive film 7 by an electrostatic charge roller 17 which is positively electrostatically charged (See FIG. 2-(d)). Thus, the lamination body 1 of the ion conductive film 7 and the particles 3 is manufactured. Last, the optical semiconductor 10 is cleaned so as to be reused (See FIG. 2-(e)).

Thus, according to the manufacturing method shown in FIG. 1 or FIG. 2, the particles 3 can be transferred to the ion conductive film 7 or the optical semiconductor 10 with an optical configuration. Therefore, it is possible to easily manufacture the lamination body 1 having an optional configuration and holding the particles (functional particles) 3. In addition, it is also possible to reuse the optical semiconductor 10. Furthermore, according to the manufacturing method by the light irradiation shown in FIG. 2, it is possible to manufacture a large number of the lamination bodies 1 in a short period of time. Generally speaking, light exposure (light irradiation) has an advantage in that a configuration having a resolution higher than a normal application method can be formed by the light exposure.

A package irradiation by a photo mask (mask 13) of light such as a halogen lamp, an imaging irradiation wherein a semiconductor laser light is scanned by a mirror or the like, a linear irradiation by an LED array, or the like is used as a light irradiation method for forming an optional configuration. More specifically, imaging by the laser light or the LED array is preferable, because it has a high resolution, a complex configuration can be made, the mask 13 is not necessary, and it has a high correspondence to a configuration change.

It is preferable that at least the optical semiconductor 10 be provided on an upper part of the conductive substrate. Under this structure, it is possible to immediately divide the electric charges generated by the light irradiation into positive electric charges and negative electric charges so that resolution can be improved. Particularly, it is preferable from the perspective of dividing the electric charges that the conductive substrate have a polarity reverse to the polarity of the surface electric charge, or is ground.

Furthermore, there is no limitation to selecting a particle 3 that is not soluble in a dispersion medium as long as it is stable in the dispersion medium. However, it should be properly selected from the perspective of a function given to the lamination body 1. In addition, the particle 3 used in this embodiment is electrostatically charged in the dispersion medium. By using this electrostatic charge, the particle 3 is adhered to the optical semiconductor (electrostatic carrier) 10 and then transferred to the ion conductive film (porous film) 7. This basically uses an electrophoretic phenomenon. The electrophoretic phenomenon is caused by an electrostatic force working due to the electric charge existing on the surface of the particle 3. A positive electric charge particle is moved to a negative electrical field and a negative electric charge particle is moved to a positive electrical field. In a case where the dispersion medium itself is a dissociative liquid (for example, water (hydrogen ion and hydroxide ion)), an ion having a high affinity to the surface of the particle 3 is specific-adsorbed to the surface and the particle 3 has the electric charge of the adsorbed ion. Furthermore, an ion having an electric charge reverse to the adsorbed ion surrounds the particle 3 so that a counter ion is formed. In a case where the dispersion medium itself is not a dissociative liquid (for example, an organic solvent) the above-described specific-adsorption generally occurs due to applying an electric charge control material (for example, a material having an electrolytic structure) so that the particle 3 has the electric charge. The electric charge can be controlled by adding the electric charge control material in the dissociative liquid such as water.

In a case where the dissociative liquid is used as the dispersion liquid used in this embodiment, a basic structure of this embodiment can be formed by only the liquid and the particles 3. However, in this case, an ingredient for the electric charge and an electric charge amount are unilaterally determined by combination of the quality of the material of the particle 3 and the dispersion medium and cannot be controlled. Accordingly, it is preferable to add the electric charge control material in order to freely control the electric charge amount and the mark (polarity) of the electric charge. Although there is no limitation, such as inorganic or organic salt, of a material used for the electric charge control material, it is preferable that the electric charge control material be properly selected by a property of the surface of the particle 3 and the mark to be electrically charged. It is also preferable that the electric charge control material have a larger surface electric charge by small application. In addition, in a process wherein only the particle and dissociative liquid, or the particle, the dissociative liquid and the electric charge control material are added, the dispersion liquid 15 not condensed and cannot be stable without making the particle small. Hence, surfactant can be added for the purpose of improving the stability of the dispersion liquid 15. In this case, if the surfactant is ionic, the surfactant itself gives an electric charge to the particle 3. Non-ionic surfactant (polyethyleneglycolic surfactant, polyalcoholic surfactant), cationic surfactant (amine salt-type surfactant, ammonium salt-type surfactant), anionic surfactant (carbonate surfactant, sulfonate surfactant, ester sulfate surfactant, ester phosphate surfactant) and amphoteric surfactant (amino-acid type-surfactant, betaine type-surfactant) can be used as the surfactant used in this case. Particularly, in order to add the electric charge to the particle 3 with a small adding amount, it is preferable to use the cationic surfactant or the anionic surfactant. In a case where non-dissociative liquid is used, the electric charge control material including the surfactant is necessary. The electric charge can be controlled by the electric charge control material not having surface activity. However, since the stability of the dispersion liquid 15 is a bar, it is preferable to use the surfactant.

The dispersion liquid 15 is manufactured by making minute or mixing a material formed by adding non-soluble particles 3 and, if necessary, a high-molecular compound having integrity, a conductive agent, and the electric charge control material, into the dispersion medium by using a dispersion method. A homogenizer, three-roller mill, sand mill, supersonic wave dispersion, or the like is used as this dispersion method. In the homogenizer, making minute or mixing of the particles 3 is performed by a rotary knife. In the three-roller mill, making minute or mixing of the particles 3 is performed by a gap which the three rotating rollers have. In the sand mill, making minute or mixing of the particles 3 is performed by mixing and stirring beads. In the supersonic wave dispersion, making minute or mixing of the particles 3 is performed by supersonic wave vibration.

The high-molecular compound having integrity and used in this embodiment is stable in the dispersion medium and has a property whereby the high-molecular compound is connected to other materials (film and the particles 3). More specifically, polyfluoroethylene, polyethylene, nitrile rubber, butadiene rubber, butyl rubber, polystyrene, styrene/butadiene rubber, nitrocellulose, cyanoethyl cellulose, polyacrylonitrile, polyfluorated vinyl, polyfluorated vinylidene, polychloroprene, polyvinylpyridine, or the like can be used as this high-molecular compound. These are used independently or used by strengthening chemical stability by mixture, copolymerization, or the like.

The ion conductive film 7 used in this embodiment has a self-holding ability. The material used for the ion conductive film 7 is an organic material, inorganic material, single material, composite material, or the like. The ion conductive film 7 should be chemically stable against at least the dispersion medium and ion conductivity in a film thickness direction. Preferably, ion conductive film 7 is a high-molecular compound and a compound wherein an ionic dissociative group is situated in a molecule can be used for the ion conductive film 7. The ionic dissociative group is a group (alkyleneoxide group, alkyleneimine group, or the like) whereby a group (hydroxyl group, carboxyl group, sulfonate group, or the like) that can be ionized or a dissociative substance (electrolytic salt, or the like) can be dissociated. More specifically, polyacrylic acid, polystyrenesulfonic acid, polyethyleneoxide, or polypropyleneoxide, or derivatives or cross-linking members of them, can be used. In a case where a self-holding film cannot be formed by a simple, for example, the ion conductive film 7 can be used by holding at a porous film.

The porous film 7 used in this embodiment can be used as long as it is stable against the dispersion medium. The porous film 7 should be able to include (hold) the ion conductive material. In a case where the porous film 7 is used, an ion conductive material in various states such as a liquid state, gel state, or liquid state can be used. Holding the ion conductive film on the porous film may be implemented after the particles 3 that are not soluble in the dispersion medium are laminated. The particles 3 that are not soluble in the dispersion medium may be laminated after the ion conductive material is held to the porous film 7. More specifically, a porous member made of glass fiber or polymer fiber (such as polyester, Teflon (Trademark), polyflon, polyethylene, polypropylene, polyimide), a member made by mixing the glass fiber or the polymer fiber, and the above-mentioned polymer foam, or the like can be used.

In a case where the lamination body 1 of this embodiment is applied as an electric chemical element, it is preferable that an ion conductive high polymer be used as a binder. This is because a function of integrity and a function of ion conductivity can be achieved by a single material. More specifically, a one dimensional high-molecular compound wherein an ionic dissociative group is situated in a molecule can be used as the ion conductive high polymer. The ionic dissociative group is a group (alkyleneoxide group, alkyleneimine group, or the like) whereby a group (hydroxyl group, carboxyl group, sulfonate group, or the like) can be ionized or a dissociative substance (electrolytic salt, or the like) can be dissociated. More specifically, polyacrylic acid, polystyrenesulfonic acid, polyethyleneoxide, or polypropyleneoxide, or their derivatives, can be used. The high-molecular compound having the above-mentioned ionic dissociative group can function as a charge control substance. From the perspective of electric chemical (oxidation-reduction) and chemical (thermal or the like) stability of a material, it is preferable that fluorated polymer be used as the binder. More specifically, polyfluoroethylene, polyfluorated vinylidene, or the like can be used as the binder.

It is preferable that the high-molecular material included in the dispersion medium have functions as a charge control member, an ion conductor, and a binder, and (electric) chemical stability, from the perspective of achievement of small size, light weight, and low cost and improvement of an electric chemical property. It is preferable to use a high-molecular material wherein a fluorocarbon structure is provided at main and side chains and an ionic dissociative group is included in a molecular chain. More specifically, it is preferable to use a high-molecular material having a perfluoroethylene structure and including the ionic dissociative group. The ionic dissociative group is properly set by conducted ionic species. It is preferable to have carboxyl group or sulfonic group material in a case of proton or to have an ethyleneoxide structure or a propyleneoxide structure in a case of lithium ion.

The conductive adhesive in this embodiment is stable in the dispersion adhesive and has a function to assist the transferring of the electron generated in the vicinity of the particle. Any electronic conductive material that is stable in the dispersion medium and the operating atmosphere of the lamination body 1 can be used in a case where the conductive adhesive is used. It is preferable that a carbon group material rather than a metal group material be used for the conductive adhesive from the perspective of stability against oxidation and reduction, light weight, good dispersion in the dispersion medium, and adhesion-ability of the ion conductive high-molecular material as the charge control member. As such a material, natural graphite or manufactured graphite can be used.

It is possible to cause an electric chemical catalyst reaction in the lamination body 1 in this embodiment by using a material having at least a catalyst action as the particle 3 not soluble in the dispersion medium used in this embodiment. Here, the material having a catalyst action promotes a chemical reaction without changing itself. It is preferable from the perspective of catalyst activation, durability, and efficiency of use that a material having the catalyst action be carried on a carrier not having the catalyst action, namely a carrier as a medium carrying the catalyst, as an embodiment of the particle. In addition, although it is necessary for the particle 3 to be charged in the embodiment of the manufacturing method of the present invention, this charge can be controlled by the charge control member as described above. It is not preferable to cover or adhere the charge control member on a material having catalyst ability because the catalyst activation is degraded. It is possible to implement the manufacturing method of this embodiment without degrading the catalyst ability by selecting the carrier so that the charge control member is well covered or adhered on the carrier.

There is no limitation as a material causing the catalyst action. However, since one of the embodiments of the present invention is lamination of the catalyst material on the ion conductive film 7, it is preferable that the ions participate in the catalyst reaction. More specifically, a single noble metal such as platinum or an alloy or a compound material of the noble metal and a second or third element including the noble metal can be used as a catalyst action material. In addition, a material as the carrier is properly selected under condition of that the material having the catalyst function and the lamination body functions. For example, an optical semiconductor 10 such as aluminum oxide, silicon oxide, carbon, silicon carbide, or titanium oxide can be used. As the catalyst, more specifically, it is preferable to use a catalyst whose main ingredient is platinum because of oxidation of organic material or hydrogen or electrolysis of water. Particularly, for the oxidation of alcohol, especially oxidation of methanol and ethanol, it is preferable to use a catalyst made of Pt and Ru or Pt and Ir.

It is preferable to use a material forming ions and a compound, a material reacting with ions, or a material ionized by electrons, as the particle 3 not soluble in the dispersion medium. Because of this, it is possible to store electric chemical energy by using the lamination body 1 manufactured by the manufacturing method of this embodiment. A material acting as an active material of a battery, such as a metal like Li, Mg, Pb, Cd, Fe, Zn, or the like, a metallic oxide such as HgO, $PbO_2$, NiOOH, AgO, $MnO_2$, or the like, sulfide, oxide occlusion alloy, phase-transfer compound, conductive polymer, or the like, can be used. The following materials are preferable because they can store energy with a high density. That is, a transition metal oxide such as $TiS_2$, $MOS_2$, $CO_2S_6$, $V_2O_5$, $MnO_2$, $CoO_2$, a transition metal chalcogen compound, a composite (Li composite oxide: $LiMnO_2$, $LiMn_2O_4$, $Li\,CoO_2$, $LiNiO_2$, or the like) of Li and the transition metal oxide or transition metal chalcogen compound, a conductive high-molecular such as polyaniline, polypyrrol, polyazulene, polyphenylene, polyacetylene, polyphthalocyanine, poly-3-methylthiophene, polypyridine, polydiphenyl benzidine, or the like, and a carbon material conjugative with lithium, can be used. From the perspective of high energy density, it is preferable to use conjugated oxide having a layer structure and indicated as $LiMO_2$, such as lithium cobalt oxide or lithium nickel oxide, or conjugated oxide having a spinel structure indicated as $LiMn_2O_4$. Particularly, since the spinel $LiMn_2O_4$ is made of manganese oxide that is low cost and exists a lot in nature, it is preferable to use the spinel $LiMn_2O_4$. Furthermore, it is preferable to use $LiMn(2-n)XnO_4$ made by a part of the Mn atom of $LiMn_2O_4$ being replaced by another atom X as a positive active material. Especially, it is preferable to mix the spinel $LiMn_2O_4$ and $LiMn(2-n)XnO_4$.

Thus, in this embodiment, the particle 3 not soluble in the dispersion medium is used, so that the lamination body 1 applicable to electronic chemical elements such as a primary battery, a secondary battery, a fuel battery, a solar battery, a condenser, an electrolytic element, or various sensors can be provided.

Here, an example of a fuel battery 20 as an example of the lamination body 1 is discussed with reference to FIG. 3. FIG.

3 is a schematic view of an internal structure of the fuel battery 20 of an embodiment of the present invention. Here, the fuel battery 20 using a proton conductive type solid high-molecule electrolyte is discussed as an example.

An ion conductor 21 such as a proton conductor is provided as the ion conductive film 7 in the center of the fuel battery 20. An anode catalyst layer 22 and a cathode catalyst layer 23 are arranged at respective sides of the ion conductor 21. The anode catalyst layer 22 and the cathode catalyst layer 23 are connected via an external circuit (load) 24. In addition, separators 26 having fuel paths 25 for supplying fuel to the anode catalyst layer 22 and the cathode catalyst layer 23 are provided at the anode catalyst layer 22 and the cathode catalyst layer 23.

Under this structure, the fuel (oxide ($H_2$), alcohol, or the like) functioning as a proton source is supplied to the anode side, so that an oxide ion ($H^+$) is generated from the fuel by the catalyst action in the anode catalyst layer 22. At this time, generated electrons ($e^-$) flow to the external circuit 24. Generated oxide ions are transferred in the ion conductor 21 so as to reach the cathode catalyst layer 23. By supplying an oxidation agent (air, oxide ($H_2$), or the like) to the cathode side, the oxide ions, oxygen, and electrons flowing through the external circuit 24 react so that water ($H_2O$) is generated. This is a concept of power generation and this reaction formula is shown as follows.

Anode reaction: $H_2 \rightarrow 2H^+ + 2e^-$ (in a case of oxide fuel)

Cathode reaction: $2H^+ + \frac{1}{2}O_2 + 2e^- \rightarrow H_2O$

Overall reaction: $H_2 + \frac{1}{2}O_2 \rightarrow H_2O$

As described above, the lamination body 1 of this embodiment is applied to a part of a structure where the anode catalyst layer 22 and the cathode catalyst layer 23 are arranged at respective sides of the ion conductor 21. In the fuel battery 20, it is necessary to laminate the catalyst layers 22 and 23 on respective sides of the ion conductor 21. This can be manufactured by repeating implementing the manufacturing method of this embodiment twice for the front and back of the ion conductor 21. In this case, different particles 3 can be laminated on the anode side and the cathode side. In addition, in a case where the same particles 3 exist at the anode and cathode sides, the catalyst layers 22 and 23 can be laminated at two parts of one side of the ion conductor 21 by irradiating light at two parts on the optical semiconductor 10 by using a photo mask, laser imaging, or the like. Hence, this can be used as a functional member of the fuel battery 20 by bending this in a state where the ion conductor 21 is inside and the catalyst layers 22 and 23 are outside so that the catalyst layers 22 and 23 overlap.

As described above, in the manufacturing method of the lamination body 1 particularly by using the optical semiconductor 10, it is possible to form the catalyst layers 22 and 23 in plural areas of the same plane surface of the ion conductive film (or porous film) 7, namely to form plural elements of the fuel battery 20, by one process. Therefore, high productivity can be obtained. It is possible to manufacture a high voltage (output) thin type fuel battery 20 by using (connecting in series or parallel) all of parts where the catalyst layers 22 and 23 are formed in plural areas of the front and back of the ion conductive film 7 as elements of the fuel battery 20. Therefore, the manufacturing method of the lamination body 1 of this embodiment is proper for a manufacturing method of the lamination body 1 of the thin type fuel battery 20.

Basically any fuel can be used for the fuel battery 20 using the lamination body 1 of this embodiment. However, since the fuel is generally received in a limited space (container) and therefore has only a constant volume, it is preferable to use fuel having a good volume or weight energy density. Particularly, it is preferable to use fuel having a good volume energy density. Gas state fuel does not have good volume energy density and therefore is not preferable. Liquid state fuel or solid state fuel is preferable. For example, since the number of electrons taken out by oxidation reaction of one molecule in a case of hydrogen is 2, an ideal amount of coulombs taken from a molecule 1 mol is 96500×2C. Since the number of electrons taken out by oxidation reaction of one molecule in a case of methanol is 6, an ideal amount of coulombs taken from a molecule 1 mol is 96500×6C. Since the number of electrons taken out by oxidation reaction of one molecule in a case of ethanol is 12, an ideal amount of coulombs taken from a molecule 1 mol is 96500×12C. Considering both density and size of the molecules, a coulomb amount per 1 $cm^3$ as the energy density in a case of hydrogen is approximately 9 $C/cm^3$, a coulomb amount per 1 $cm^3$ as the energy density in a case of methanol is approximately 14400 $C/cm^3$, and a coulomb amount per 1 $cm^3$ as the energy density in a case of ethanol is approximately 15200 $C/cm^3$. The energy density per unit volume of hydrogen as gas at a normal pressure becomes extremely low. Although one hydrogen molecule is necessary for oxidation reaction of methanol and three hydrogen molecules are necessary for oxidation reaction of ethanol (see the following reaction formulas), it is clear that the liquid fuel is good.

$CH_3OH + H_2O \rightarrow 6H^+ + 6e^- + CO_2$ $C_2H_5OH + 3H_2O \rightarrow 12H^+ + 12e^- + 2CO_2$ Although hydrogen in a high pressure state and liquid oxide can be used, it is necessary to make the container strong. Hence, considering an energy density including the container, fuel of liquid or solid state at normal temperature and pressure is better. Of the solid state or liquid state fuels such as gasoline, hydrogen stored as a hydrogen occlusion alloy, liquid state carbon, or liquid state alcohol, it is preferable to use alcohol fuel from the perspective of achievement of small size of the fuel battery or good volume energy density. It is possible to form the portable type fuel battery 20 whereby driving time is improved, by using the alcohol fuel; more specifically, the alcohol wherein the number of carbons is equal to or less than 4. Particularly, ethanol is preferable for use from the perspective of the environment, namely the capability of biosynthesis. Such a fuel battery 20 has good volume energy density and weight energy density and therefore is suitable for carrying in a portable machine.

It has been studied to use a modified fuel type fuel battery wherein hydrogen obtained not by direct oxidation of liquid fuel but by modifying liquid natural gas (LNG), a carbon hydride group fuel such as methane gas, or liquid fuel such as methanol is used as fuel of the fuel battery 20. In this case, there is a problem of catalyst poisoning causing degradation of the function of the fuel battery 20 by very small quantities of carbon monoxide or other impurities existing in the hydrogen gas fuel obtained by modifying the original fuel. A platinum-ruthenium (Pt—Ru) alloy catalyst is suggested as a catalyst to reduce the problem of catalyst CO poisoning. However, it may not be possible to explain the obstacle reason of the catalyst chemical reaction of the anode oxidation of the ethanol or methanol in the liquid as just CO poisoning. This is because the oxidation reaction of methanol or ethanol is done by a larger numbers of elementary processes than oxide or CO. According to this embodiment, for the oxidation of methanol, a catalyst made of Pt, Pt and Ru, or Pt and Ir is preferable. For the oxidation of ethanol, a catalyst made of at least three kinds of catalyst ingredients belonging to the group consisting of Pt, Ru, Ir, W, and Sn is preferable. These catalysts contribute to the promotion of a complex reaction elementary process of the methanol or ethanol.

As described above, the lamination body 1 manufactured by the manufacturing method of this embodiment is proper for manufacturing the thin type fuel battery 20, more specifically the portable machine having a thin configuration. Similarly, the manufacturing method of this embodiment is proper for manufacturing the thin type battery (primary and secondary batteries). Such a battery can be properly used for the thin type portable machine.

FIRST EXAMPLE

First, an amorphous selenium layer 31 is manufactured on an aluminum (Al) substrate 30 having an area of 10 cm×10 cm by vacuum evaporation. The Al substrate 30 is ground. The amorphous selenium layer 31 is positively charged so as to have charged electric potentials of approximately 1 kV by a charging machine (scorotron) 32. See FIG. 4-($a$). After that, the halogen lamp light is irradiated via a glass photo mask 34 having four opening parts 33 having an area of 20 mm×20 mm so that charged electric potential of the irradiated part of the amorphous selenium layer 31 is attenuated. See FIG. 4-($b$). Thus, a positive charge part 35 is formed on the amorphous selenium layer 31. Next, the dispersion liquid 36 for a dispersion process where 8 wt % of carbon (made by US Electrochem Company) and platinum being carried in isoperm and 4 wt % of perfluorosulfonic acid are added are prepared. This dispersion liquid 36 includes the particle whose main body is carbon where platinum is carried.

Next, the dispersion liquid 36 is applied on the light-irradiated amorphous selenium layer 31 by a conductive rubber roller 37 having a negative polarity, so that the particles 3 are electrophoretically moved to a positive charge part 35 (See FIG. 4-($c$)). After this, the ion conductive film 7 (made by Dupon Company, "Nafion (Trademark)") is put in contact with the light-irradiated amorphous selenium layer 31 by a conductive rubber roller 38 having a positive polarity, and simultaneously the ion conductive film 7 is pealed off from the amorphous selenium layer 31. As a result of this, the particle 3 whose main body is carbon wherein platinum is carried is transferred to the ion conductive film 7. See FIG. 4-($d$).

By implementing such a process, the lamination body 1 of the ion conductive film 7 and the particle 3 is manufactured. See FIG. 4-($e$). The inventor found that the transferred configuration after a dry process is implemented is substantially same as the configuration of the photo mask 34. After the amorphous selenium layer 31 is cleaned, the same lamination body 1 was made by implementing the same process. This means that the particle (functional particle) 3 and the ion conductive film 7 can be compounded at an optional position with an optional size (for example, configuration such as square or rectangular) and the substrate 30 can be reused.

SECOND EXAMPLE

While the Al substrate 30 with amorphous selenium layer 31 is scanned at a constant speed, the light is directly irradiated on the amorphous selenium layer 31 by using an LED array whose resolution is 600 dpi, without using the photo mask 34. Other than this, the same processes as the first example are implemented and the light irradiation configuration is adjusted so as to be the same as the first example. By implemented such a process, the inventor manufactured the lamination body 1 of the ion conductive film 7 and the particle 3 whose transfer configuration has an area of approximately 20 mm×20 mm. This means that the particle (functional particle) 3 and the ion conductive film 7 can be compounded at an optional position with an optional size (for example, configurations such as square or rectangular) and the lamination body 1 can be formed without using the mask.

THIRD EXAMPLE

While the Al substrate 30 with amorphous selenium layer 31 is scanned at a constant speed, the light is directly irradiated with a line width of 84 μm on the amorphous selenium layer 31 by using an LED array whose resolution is 600 dpi. Other than this, the same processes as the first example are implemented. By implemented such a process, the inventor manufactured the lamination body 1 of the ion conductive film 7 and the particle 3 having a transfer configuration of approximately 100 μm. This means that the particle (functional particle) 3 and the ion conductive film 7 can be compounded at an optional position with an optional size (for example, configurations such as square or rectangular), the lamination body 1 can be formed without using the mask, and the lamination body 1 having a high resolution (fine pattern) can be manufactured.

FOURTH EXAMPLE

By using the manufacturing process of the second example, the lamination body 1 where the platinum carrying carbon layers having areas of 5 cm$^2$ are formed on both surfaces of the ion exchange film is manufactured. After an acid treatment is applied to this lamination body 1, this lamination body is installed in a fuel battery property evaluation cell (made by US Electrochem company: FC05-01SP). Humidified hydrogen is supplied to an anode side and humidified oxygen is supplied to a cathode side. Because of this, it was found by the inventor that an electromotive force of 0.91 V is generated and lamination body 1 functions as an electrochemical element.

FIFTH EXAMPLE

By using the manufacturing process of the second example, the platinum carrying carbon layers having areas of 5 cm$^2$ formed on both surfaces of the ion exchange film is manufactured. Next, the dispersion liquid 36 for a dispersion process where 10 wt % of carbon (made by US Electrochem Company) wherein platinum ruthenium is carried in isoperm and 5 wt % of perfluorosulfonic acid are added is prepared.

Next, by using the dispersion liquid 36 and the same method as the second example, the platinum ruthenium carrying carbon is transferred to a back surface of a part where the platinum carrying carbon of the ion exchange film is laminated, and then made dry. After an acid treatment is applied to this lamination body 1, this lamination body is installed in a fuel battery property evaluation cell (made by US Electrochem company: FC05-01SP). Then, 3% methanol liquid is supplied to an anode side and humidified oxygen is supplied to a cathode side. Because of this, it was found by the inventor that an electromotive force of 0.87 V is generated and lamination body 1 functions as an electrochemical element.

SIXTH EMBODIMENT

First, an amorphous selenium layer 31 is manufactured on an aluminum (Al) substrate 30 having an area of 10 cm×10 cm by vacuum evaporation. The Al substrate 30 is ground. The amorphous selenium layer 31 is positively charged so as to have charged electric potentials of approximately 1 kV by a charging machine (scorotron) 32. See FIG. 4-(*a*). After that, the halogen lamp light is irradiated via a glass photo mask 34 having 5 cm opening parts 33 so that charged electric potentials of the irradiated parts of the amorphous selenium layer 31 are attenuated. See FIG. 4-(*b*). Thus, a positive charge part 35 is formed on the amorphous selenium layer 31. Next, the dispersion liquid 36 for a dispersion process where 10 wt % of electrolysis manganese dioxide where carbon covers isoperm and 5 wt % of perfluorosulfonic acid are added is prepared.

Next, the dispersion liquid 36 is applied on the light-irradiated amorphous selenium layer 31 by a conductive rubber roller 37 having a negative polarity, so that the particles 3 are electrophoretically moved to a positive charge part 35 (See FIG. 4-(*c*)).

After this, the polypropylene porous film 7 is put in contact with the light-irradiated amorphous selenium layer 31 by a conductive rubber roller 38 having a positive polarity, and simultaneously the polypropylene porous film 7 is pealed off from the amorphous selenium layer 31. As a result of this, the particle 3 whose main body is electrolysis manganese dioxide covered with carbon is transferred to the polypropylene porous film 7. See FIG. 4-(*d*).

By implementing such a process, the lamination body 1 of the ion conductive film 7 and the particle 3 is manufactured. See FIG. 4-(*e*). The inventor found that the transferred configuration after a dry process is implemented is substantially same as the configuration of the photo mask 34. This means that the particle (functional particle) 3 and the ion conductive film 7 can be compounded at an optional position with an optional size (for example, configurations such as square or rectangular).

SEVENTH EXAMPLE

The lamination body 1 of the sixth embodiment is immersed in a solution including 9% of zinc chloride and 26% of ammonium chloride so that the porous film 7 is sufficiently immersed in the solution. Then, the lamination body 1 is taken out, and a corrosion resisting stainless plate is placed in contact with the manganese dioxide side and a zinc plate is placed in contact with the porous film side. In this state, the inventor measured an electromotive force between stainless and zinc. It was found by the inventor that an electromotive force of approximately 1.6 V is generated and the lamination body 1 functions as an electrochemical element.

The present invention is not limited to the above-discussed embodiments, but variations and modifications may be made without departing from the scope of the present invention.

This patent application is based on Japanese Priority Patent Application No. 2004-78180 filed on Mar. 18, 2004, the entire contents of which are hereby incorporated by reference.

What is claimed is:

1. A manufacturing method of a lamination body of an electrolytic body and a particle, comprising the steps of:
    a) electrostatically charging an electrostatic carrier configured to carry static electricity at a designated polarity;
    b) immersing the electrostatically charged electrostatic carrier in dispersion liquid in which the particle electrostatically charged at a polarity reversed to the designated polarity is dispersed, so that the particle is adhered to the electrostatic carrier; and
    c) transferring the particle adhering to the electrostatic carrier to the electrolytic body made of electrolyte, by applying a direct-current electrical field.

2. The manufacturing method of the lamination body of the electrolytic body and the particle as claimed in claim 1, further comprising the step of:
    d) eliminating the electric charge in a designated area of the electrostatically charged electrostatic carrier.

3. The manufacturing method of the lamination body of the electrolytic body and the particle as claimed in claim 2,
    wherein the electrostatic carrier is an optical semiconductor device, and
    light is irradiated on the designated area of the electrostatically charged electrostatic carrier so that the electric charge in the designated area of the electrostatically charged electrostatic carrier is eliminated, in the step d).

4. The manufacturing method of the lamination body of the electrolytic body and the particle as claimed in claim 1,
    wherein the dispersion liquid includes a high-molecular compound having integrity.

5. The manufacturing method of the lamination body of the electrolytic body and the particle as claimed in claim 4,
    wherein the high-molecular compound is an ion conductive polymer.

6. The manufacturing method of the lamination body of the electrolytic body and the particle as claimed in claim 4,
    wherein the high-molecular compound is a fluorine group polymer.

7. The manufacturing method of the lamination body of the electrolytic body and the particle as claimed in claim 1,
    wherein the dispersion liquid includes a conductive agent.

8. The manufacturing method of the lamination body of the electrolytic body and the particle as claimed in claim 7,
    wherein the conductive agent is carbon.

9. The manufacturing method of the lamination body of the electrolytic body and the particle as claimed in claim 1,
    wherein the particle is a metal catalyst.

10. The manufacturing method of the lamination body of the electrolytic body and the particle as claimed in claim 9,
    wherein the metal catalyst is made of Pt, Pt and Ru, or Pt and Ir.

11. The manufacturing method of the lamination body of the electrolytic body and the particle as claimed in claim 9,
    wherein the metal catalyst is made of at least three kinds of catalyst ingredients belonging to the group consisting of Pt, Ru, Ir, W, and Sn.

12. The manufacturing method of the lamination body of the electrolytic body and the particle as claimed in claim 1,
    wherein the particle includes a material forming an ion and a compound, a material reacting with an ion, or a material being ionized by an electron.

\* \* \* \* \*